United States Patent
Sieker et al.

(10) Patent No.: US 10,604,134 B2
(45) Date of Patent: Mar. 31, 2020

(54) PNEUMATIC BRAKING SYSTEM FOR A TRAILER VEHICLE

(71) Applicant: WABCO GmbH, Hannover (DE)

(72) Inventors: Armin Sieker, Bielefeld (DE); Axel Stender, Hameln (DE); Norbert Witte, Lauenau (DE)

(73) Assignee: WABCO GmbH, Hannover (DE)

( * ) Notice: Subject to any disclaimer, the term of this patent is extended or adjusted under 35 U.S.C. 154(b) by 140 days.

(21) Appl. No.: 15/580,798

(22) PCT Filed: Jun. 4, 2016

(86) PCT No.: PCT/EP2016/000921
§ 371 (c)(1),
(2) Date: Dec. 8, 2017

(87) PCT Pub. No.: WO2016/198153
PCT Pub. Date: Dec. 15, 2016

(65) Prior Publication Data
US 2018/0229708 A1    Aug. 16, 2018

(30) Foreign Application Priority Data
Jun. 10, 2015   (DE) .................. 10 2015 007 383

(51) Int. Cl.
*B60T 8/32* (2006.01)
*B60T 15/20* (2006.01)
(Continued)

(52) U.S. Cl.
CPC .............. *B60T 15/206* (2013.01); *B60T 7/20* (2013.01); *B60T 13/265* (2013.01);
(Continued)

(58) Field of Classification Search
CPC ........ B60T 8/327; B60T 13/68; B60T 13/265; B60T 13/385; B60T 13/662; B60T 13/683
(Continued)

(56) References Cited

U.S. PATENT DOCUMENTS 3,093,421 A * 6/1963 Euga ..................... B60T 13/62
303/2
3,443,839 A   5/1969 Hinrichs et al.
(Continued)

FOREIGN PATENT DOCUMENTS

DE    10335717 A1    3/2005
DE    102006040950 A1    3/2008
(Continued)

OTHER PUBLICATIONS

PCT/EP2016/000921 International Search Report dated Sep. 26, 2016, 3 pages.
(Continued)

*Primary Examiner* — Christopher P Schwartz
(74) *Attorney, Agent, or Firm* — Warner Norcross & Judd LLP (57) ABSTRACT

Disclosed is a valve arrangement for aerating spring accumulator brake cylinders in a trailer vehicle with a pneumatic braking system, the valve arrangement having a first connection for a line connected to a reservoir of the trailer vehicle, a second connection for a line leading to the spring accumulator brake cylinders, and a first pneumatic control input, wherein the first connection can be connected to the second connection depending on the pressure on the first pneumatic control input. The first control input is connected to a line connected to a control connection of the trailer vehicle or to a line connected to the reservoir. A valve unit,
(Continued)

"Automatic braking"

a pneumatic braking system, a method of operating the same, and a trailer vehicle including the same are also disclosed.

19 Claims, 11 Drawing Sheets

(51) Int. Cl.
| | |
|---|---|
| *B60T 15/48* | (2006.01) |
| *B60T 15/18* | (2006.01) |
| *B60T 7/20* | (2006.01) |
| *B60T 13/68* | (2006.01) |
| *B60T 15/04* | (2006.01) |
| *B60T 13/66* | (2006.01) |
| *B60T 13/26* | (2006.01) |
| *B60T 15/02* | (2006.01) |
| *B60T 15/24* | (2006.01) |
| *B60T 15/50* | (2006.01) |

(52) U.S. Cl.
CPC ............ *B60T 13/268* (2013.01); *B60T 13/66* (2013.01); *B60T 13/68* (2013.01); *B60T 13/683* (2013.01); *B60T 15/027* (2013.01); *B60T 15/04* (2013.01); *B60T 15/18* (2013.01); *B60T 15/20* (2013.01); *B60T 15/203* (2013.01); *B60T 15/243* (2013.01); *B60T 15/48* (2013.01); *B60T 15/50* (2013.01)

(58) Field of Classification Search
USPC ...... 188/3 R, 107, 112 R; 303/3, 7, 9.76, 15, 303/118.1, 123, 127; 137/627.5
See application file for complete search history.

(56) References Cited

U.S. PATENT DOCUMENTS

| | | | | |
|---|---|---|---|---|
| 5,429,426 | A * | 7/1995 | Hart ...................... | B60T 13/406 303/33 |
| 5,924,672 | A * | 7/1999 | Crochet .............. | F16K 31/1221 105/377.07 |
| 6,206,481 | B1 * | 3/2001 | Kaisers ................... | B60T 8/327 303/118.1 |
| 6,758,536 | B2 * | 7/2004 | Jacob ................... | B60T 13/263 188/3 H |
| 6,910,744 | B2 * | 6/2005 | Heller ................... | B60T 15/185 303/27 |
| 8,864,245 | B2 * | 10/2014 | Schnittger ............. | B60T 13/662 137/625.25 |
| 2010/0072810 | A1 * | 3/2010 | Bensch ................... | B60T 8/362 303/17 |
| 2012/0001477 | A1 * | 1/2012 | Mederer ............... | B60T 13/683 303/9.76 |
| 2014/0103237 | A1 * | 4/2014 | Herges ..................... | B60T 7/20 251/129.01 |
| 2018/0222463 | A1 * | 8/2018 | Risse ...................... | B60T 13/38 |

FOREIGN PATENT DOCUMENTS

| | | |
|---|---|---|
| DE | 12007038472 A1 | 2/2009 |
| DE | 102007053767 B3 | 3/2009 |
| DE | 102011101438 A1 | 11/2012 |
| DE | 102013100538 A1 | 7/2014 |
| EP | 1382502 A1 | 1/2004 |
| EP | 1386810 A1 | 2/2004 |
| EP | 1538054 A2 | 6/2005 |
| EP | 2058186 A2 | 5/2009 |
| EP | 2082935 A2 | 7/2009 |
| EP | 2190706 B1 | 6/2011 |
| EP | 2567874 A2 | 3/2013 |
| EP | 2757011 A1 | 7/2014 |
| FR | 1553551 A | 1/1969 |
| WO | WO2005063540 A1 | 7/2005 |

OTHER PUBLICATIONS

English language abstract and machine translation for EP1386810 (A1) extracted from http://worldwide.espacenet.com database on Sep. 19, 2019, 18 pages.
English language abstract and machine translation for DE10335717 (A1) extracted from http://worldwide.espacenet.com database on Sep. 18, 2019, 21 pages.
English language abstract and machine translation for EP1538054 (A2) extracted from http://worldwide.espacenet.com database on Sep. 18, 2019, 13 pages.
English language abstract and machine translation for DE102006040950 (A1) extracted from http://worldwide.espacenet.com database on Sep. 19, 2019, 11 pages.
English language abstract and machine translation for DE102007053767 (B3) extracted from http://worldwide.espacenet.com database on Sep. 18, 2019, 17 pages.
English language abstract and machine translation for EP2058186 (A2) extracted from http://worldwide.espacenet.com database on Sep. 19, 2019, 27 pages.
English language abstract and machine translation for EP2082935 (A2) extracted from http://worldwide.espacenet.com database on Sep. 18, 2019, 21 pages.
English language abstract and machine translation for EP2567874 (A2) extracted from http://worldwide.espacenet.com database on Sep. 19, 2019, 27 pages.
English language abstract and machine translation for EP2757011 (A1) extracted from http://worldwide.espacenet.com database on Sep. 19, 2019, 50 pages.
English language abstract and machine translation for DE102013100538 (A1) extracted from http://worldwide.espacenet.com database on Sep. 19, 2019, 52 pages.

* cited by examiner

Fig. 3

"Overload protection"

Fig. 2

"Automatic braking"

Fig. 4 "Travel position"

Fig. 5 "Automatic braking"

Fig. 6 "Parking position"

Fig. 7 "Overload protection"

Fig. 8 "Travel position"

Fig. 9 "Automatic braking"

Fig. 10 "Parking position"

Fig. 11 "Overload protection"

Fig. 12 "Anti-locking protection"

PNEUMATIC BRAKING SYSTEM FOR A TRAILER VEHICLE

CROSS-REFERENCE TO RELATED APPLICATIONS

This application is the National Stage of International Application No. PCT/EP2016/000921, filed on 4 Jun. 2016, which claims priority to and all advantages of German Patent Application No. 10 2015 007 383.4, filed on 10 Jun. 2015, the content of which is hereby incorporated by reference.

FIELD OF THE INVENTION

The invention generally relates to a valve arrangement and, more specifically, to a valve arrangement for aerating spring accumulator brake cylinders in a trailer vehicle with a pneumatic braking system, as well as to a pneumatic braking system, a trailer vehicle with the pneumatic braking system, a valve unit and a method for operating the pneumatic braking system for a trailer vehicle.

BACKGROUND OF THE INVENTION

A pneumatic braking system of a trailer vehicle is typically connected via two pneumatic lines to a drawing vehicle. A line conducts control pressure via a control connection to the trailer vehicle. The other line conducts reservoir pressure via a supply connection to the trailer vehicle. As a result of the legal provisions in Germany and other countries, the control connection has a yellow coupling head and the supply connection has a red coupling head.

A safety function is integrated in the event that the line for the reservoir pressure severs. To this end, the pressure in the line is monitored. In the case of an excessive drop in pressure, the trailer vehicle is automatically braked by accumulator spring brakes.

The trailer vehicle has a reservoir for compressed air which is fed via the supply connection. As a result, the trailer vehicle can be braked several times in quick succession without the compressed air required for this having to be supplied simultaneously via the supply connection.

Modern pneumatic braking systems have combined brake cylinders, namely with diaphragm service brake cylinder and spring accumulator brake cylinder in a joint assembly. This has the advantage that brake pistons, brake levers and brake discs or brake drums only have to be present once for each assembly. Only spring accumulator brake cylinders and service brake cylinders are present next to one another for each assembly. Such combined brake cylinders are also referred to as tristop cylinders.

In order to avoid mechanical overloading, spring accumulator brake cylinders and service brake cylinders should not simultaneously exert braking force. The forces of spring accumulators thus act within the brakes after a drop in pressure on the supply connection or in the subsequent lines. If the service brakes are now additionally activated by a driver because sufficient pressure is still present in the reservoir, the forces resulting from the actuation of the service brake cylinders additionally act within the brakes. An addition of forces arises which can bring about damage or even destruction of components.

Additive actuation of spring accumulator brakes and service brakes can also occur during normal parking of the trailer vehicle. The spring accumulator brakes are simultaneously parking brakes. If the parking brakes are activated and the service brakes are additionally actuated by the driver, the addition of forces discussed above also occurs.

An overload protection is required to avoid the stated damage or destruction.

A valve arrangement for the automatic braking of a trailer vehicle via the spring accumulator brakes in the event of severing of the reservoir line is disclosed in EP 2 190 706 B1. Aeration of the spring accumulator brake cylinders is carried out either by the pressure in the reservoir or by service brake pressure. Switching between the two stated pressures is carried out via a control input. In the normal case, the control input conducts pressure from a line following on from the supply connection.

SUMMARY OF THE INVENTION

The present invention provides a valve arrangement and a pneumatic braking system comprising the valve arrangement and having an improved overload protection.

In the valve arrangement, a first control input is connected for connection to a line connected to a control connection of a trailer vehicle or for connection to a line connected to a reservoir. The supply of compressed air from the reservoir to spring accumulator brake cylinders, i.e. the aeration thereof, is regulated via the pressure at the first control input. Regulation can be carried out depending on the pressure on the control connection or the pressure present in the reservoir. The connection of the control input to a line connected to the control connection is particularly advantageous. The control pressure bearing on the control connection then influences the aeration of the spring accumulator brake cylinders and thus ensures avoidance of an overload in the brakes. The aeration of the spring accumulator brake cylinders can also alternatively be regulated via pressure in the reservoir. In the normal case, the reservoir conducts sufficient pressure. In the case of supply of this pressure to the first control input, the valve arrangement switches to aeration of the spring accumulator brake cylinders.

The first connection is advantageously connected to the second connection if a pressure above a threshold value is present in the line connected to the first control input. Upon exceeding of the threshold value, the two connections are connected to one another, otherwise not or only partially. This type of regulation is particularly simple and can be realized, for example, by a valve in which a piston is displaceable by the control pressure counter to the pressure of a spring. Upon exceeding of the threshold value at the first control input, the spring accumulator brake cylinders are thus aerated. Vice versa, the spring accumulator brake cylinders are generally vented again as soon as the pressure at the first control input once again undershoots the threshold value.

In certain embodiments, the valve arrangement also comprises a third connection as a vent, wherein the second connection is connectable to the third connection or to the first connection. The venting of the spring accumulator brake cylinders is then carried out via the third connection of the valve arrangement. This enables simple control and a simple structure.

In these or other embodiments, the valve arrangement further comprises a second pneumatic control input which is connected to a line connected to the supply connection. Here, the first connection can also be connected to the second connection depending on the pressure on the second control input. Aeration of the spring accumulator brake cylinders can thus be regulated via both the first and second pneumatic control inputs.

The first connection is advantageously connected to the second connection if a pressure above a threshold value acts upon at least one of the first and second control inputs. The first and second control inputs act in the sense of an OR circuit. It is only in the event that pressure does not act on either of the first and second control inputs that the first connection and the second connection are not connected to one another or the spring accumulator brake cylinders are not aerated.

In various embodiments, the valve arrangement has a multi-way valve with at least two shifting positions wherein the first control input, first connection and second connection are assigned to the multi-way valve. The multi-way valve is typically a 3/2-way valve. The two connections are generally components of the multi-way valve.

In these embodiments, a third connection may be assigned as a venting connection to the multi-way valve. The venting connection may be a component of the multi-way valve.

When the valve arrangement comprises the multi-way valve, the second control input may be advantageously assigned to the multi-way valve. The second control input may be a component of the valve and is connected in particular to a line connected to the supply connection of the trailer vehicle.

As one example, 2.5 bar or more is provided as defined threshold values for the pressures on the first and second control inputs. Different threshold values of the pressures on the first and second control inputs are also contemplated.

In specific embodiments, the valve arrangement has the following features:

a) either a pressure from the line coming from the control connection or a pressure from the line coming from the reservoir is present at the first control input, b) a reservoir pressure from a reservoir pressure line is present at a second control input, c) the pressure from the line coming from the reservoir is present at the first connection, d) the pressure from the line leading to the spring accumulator brake cylinders is present at the second connection, e) a third connection is provided for venting, and f) the valve arrangement is configured in such a manner that:

upon exceeding of a threshold value of the pressure at the second control input and undershooting of a threshold value of the pressure at the first control input, the first connection is connected to the second connection (travel position), upon undershooting of a defined threshold value of the pressure at the first control input and undershooting of a defined threshold value of the pressure at the second control input, the second connection is connected to the third connection and the first connection is shut off (automatic braking and parking position), and upon exceeding of a defined threshold value of the pressure at the first control input and in particular undershooting of a defined threshold value of the pressure at the second control input, the first connection is connected to the second connection (overload protection).

In these or other embodiments, the valve arrangement has the following features:

a) a parking/release valve, b) the valve arrangement contains a multi-way valve with at least two shifting positions, wherein the valve arrangement vents the spring accumulator brake cylinders in a first shifting position and in a second shifting position connects the line to the reservoir to the spring accumulator brake cylinders via a check valve, c) the first control input is connectable via a further shift element to the line to the control connection or to the line to the reservoir, d) a second control input is connectable via the parking/release valve to a reservoir pressure line to the supply connection or to a line to the reservoir or to a vent, e) the multi-way valve shifts into the second shifting position if at least one of the control inputs conducts a pressure which exceeds a threshold value, and f) the multi-way valve shifts into the first shifting position if both control inputs conduct pressures which exceed threshold values.

The further shift element is advantageously part of a trailer brake module. The further shift element may be what is known as a redundancy valve. Activation of an emergency braking function with overload protection is possible in a different manner with the further shift element. In the case of sufficient pressure in the reservoir, the spring accumulator brake cylinders are aerated again in the case of emergency braking triggered by a drop in pressure and the spring accumulator brakes are thus released. Instead, the service brakes can be actuated by the electronic braking system. The normally present anti-locking control system can also be active in this case.

In certain embodiments, the valve arrangement includes a Select-High valve with two or more control inputs. In a Select-High valve, the respectively higher pressure in the control inputs controls the function of the valve or the valve arrangement.

The present invention also provides a valve unit for aerating the spring accumulator brakes, the valve unit comprising a first piston, a first cylinder chamber, a second piston and a second cylinder chamber, wherein the first cylinder chamber has a first control input, wherein the first and second pistons are held coaxially to one another and are moveable, wherein the second cylinder chamber is provided between the first and second pistons and has a second control input for the pressure from a line connected to the supply connection, and wherein one of the first and second pistons has an extension which protrudes into the second cylinder chamber. An annular configuration of the second cylinder chamber, namely around the extension, is produced in the region of the extension. As a result, the first and second pistons always have a minimum distance to one another and the second cylinder chamber contains a minimum volume. The extension can thus transmit force from the first piston to the second piston and is typically part of the first piston.

The second control input for the reservoir pressure is positioned on the second cylinder chamber so that it cannot be shut off by either of the first and second pistons. The second piston is moved away from the first cylinder chamber either by the first piston in the case of sufficient pressure in the first cylinder chamber or by sufficient pressure in the second cylinder chamber. The second piston regulates the connection or shutting off between three connections, namely a first connection for a line to the reservoir, a second connection for lines to the spring accumulator brakes and a third connection for a vent.

The present invention further provides an alternative embodiment of a valve unit for aerating spring accumulator brake cylinders of a pneumatic braking system, in particular of a 3/2-way valve type, having a first connection, a second connection and a third connection on a housing, wherein a connection from the first connection to the second connection can be switched to a connection from the first connection to the third connection, having a first piston between a first cylinder chamber and a second cylinder chamber in the housing, wherein the first cylinder chamber has a first control input and the second cylinder chamber has a second control input, and having a secand piston between the second cylinder chamber and a cylinder chamber, wherein one of the first and second pistons has an extension which projects into the second cylinder chamber. Switching of the valve unit is influenced via the first and second control inputs.

The present invention additionally provides a pneumatic braking system and a trailer vehicle with a pneumatic braking system.

A method for operating a pneumatic braking system for a trailer vehicle is also provided. According to the method, the braking system has a control connection, a supply connection, service brakes, spring accumulator brakes, a reservoir and a valve arrangement with a pneumatic control input, wherein spring accumulator brake cylinders are aerated from the reservoir depending on the pressure on the pneumatic control input. Here, the pressure on the pneumatic control input is derived from the pressure on the control connection or from the pressure in the reservoir. Aeration of the spring accumulator brake cylinders is carried out from the reservoir, but depending on the pressure at the control connection or the pressure in the reservoir. The key issue is typically whether the pressure at the control input exceeds or undershoots a defined threshold value. In the simplest case, the pressure on the pneumatic control input matches the pressure on the control connection or the pressure in the reservoir. Different pressures can, however, also be present at the pneumatic control input, which pressures are dependent on the pressure on the control connection or on the pressure in the reservoir or are produced from these pressures. This also applies to the pressures cited above in conjunction with the braking system.

BRIEF DESCRIPTION OF THE DRAWING

The invention is described in greater detail below with reference to the accompanying figures, in which.

DETAILED DESCRIPTION

Figure 4:
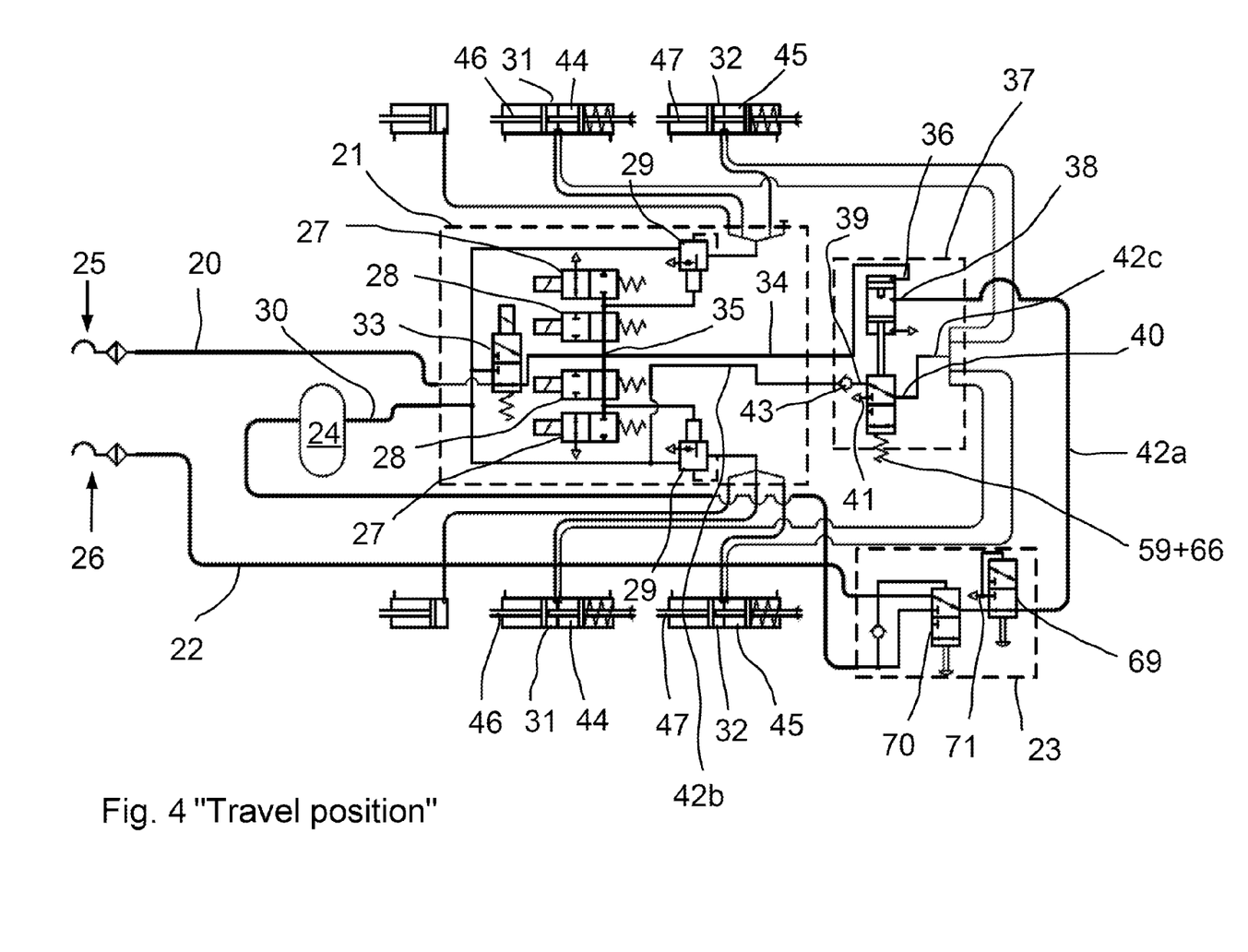
FIG. 4 shows the pneumatic braking system with the double-piston valve in the travel position.

With reference to the specific embodiment of the Figures, wherein like numerals generally indicate like parts throughout the several views, FIG. 4 shows a pneumatic braking system for a trailer vehicle. A control pressure line 20 leads to a trailer brake module 21. A reservoir pressure line 22 leads to a parking release valve 23 and from this further via a reservoir 24 to trailer brake module 21. In accordance with legal provisions in certain countries, control pressure line 20 has a yellow coupling head 25 for a control connection and reservoir pressure line 22 has a red coupling head 26 for a supply connection.

Trailer brake module 21 may be constructed in a familiar manner, namely for each vehicle side with two solenoid valves 27, 28 and a relay valve 29. The supply of the control pressure to relay valves 29 is regulated via the solenoid valves 27, 28. Relay valves are simultaneously connected via a line 30 with branches to reservoir pressure from reservoir 24 and output released service brake pressure to service brake cylinders 31, 32.

A further component of the trailer brake module 21 is a redundancy valve 33 as a solenoid valve with which the connection between the control pressure line 20 and a line 34 can be separated and adjusted. In this manner, line 34 can alternatively be connected to line 30 and the reservoir pressure from the reservoir 24. Line 34 further connects the solenoid valves 28 of both vehicle sides to one another via a branch 35.

Line 34 (in the case of correspondingly shifted redundancy valve 33) further connects the control pressure line 20 to a first control input 36 of a valve arrangement 37. The valve arrangement 37 has in particular the function of overload protection and also has, for this purpose, a second control input 38 as well as a first connection 39, a second connection 40 and a third connection 41, see also FIGS. 1 to 3.

The second control input 38 is connected via a line 42a and the parking release valve 23 to the reservoir pressure line 22. The first connection 39 is connected via a line 42b, a check valve 43 and the trailer brake module 21 to the reservoir 24. The second connection 40 is connected via a line 42c and branches to spring accumulator brake cylinders 44, 45 of both vehicle sides. The third connection 41 is a venting connection.

In the braking system shown, service brake cylinders 31, 32 are components of what are known as combi-cylinders, namely with integrated spring accumulator brake cylinders 44, 45, wherein the forces act during activation of the service brake on one hand and of spring accumulators on the other hand on the same brake pistons 46, 47.

Figure 1:
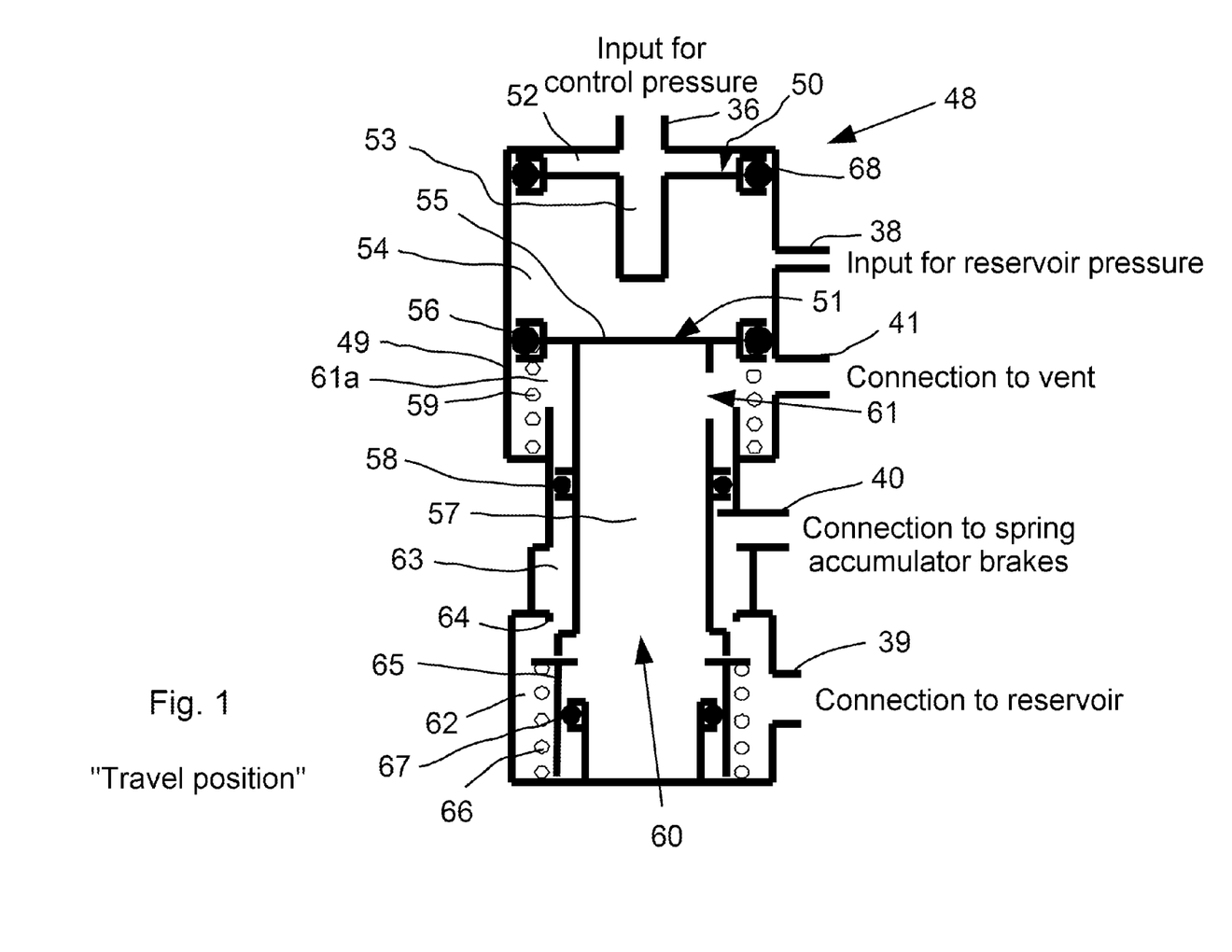
FIG. 1 shows a double-piston valve for a pneumatic braking system of a trailer vehicle in a travel position.
Figure 2:
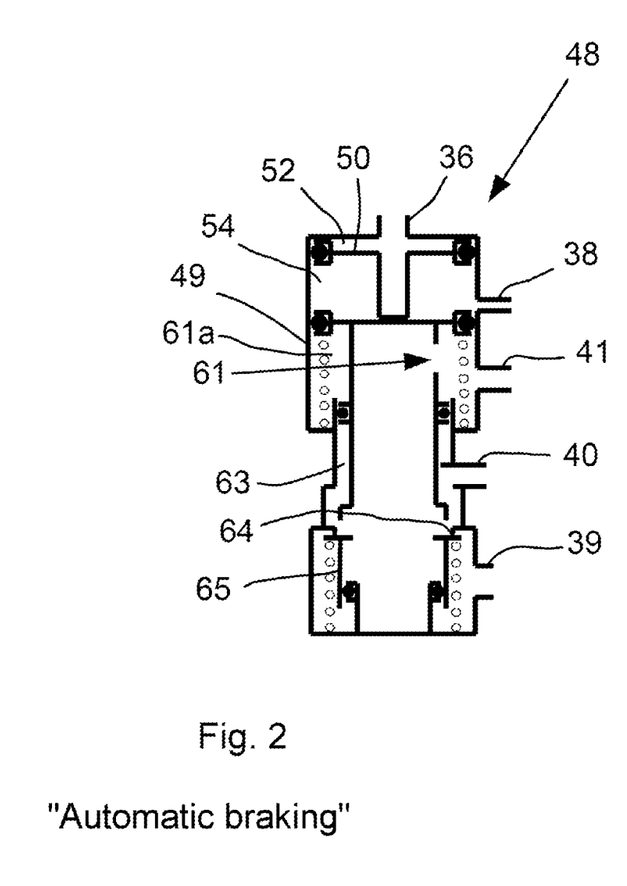
FIG. 2 shows the double-piston valve in a position for automatic braking.
Figure 3:
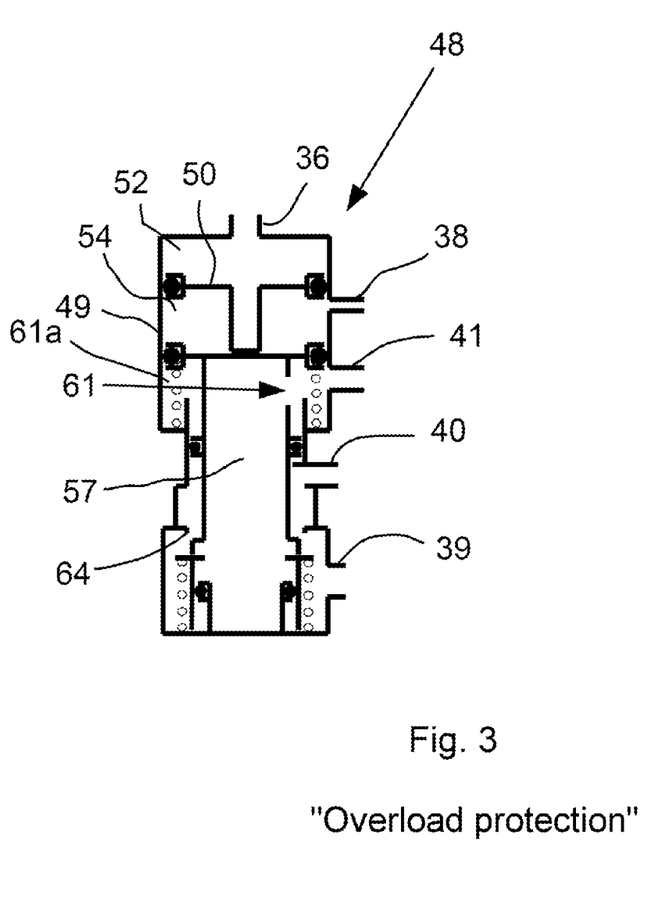
FIG. 3 shows the double-piston valve in a position for overload protection.

The valve arrangement 37 contains a valve unit 48 in the manner of a double-piston valve, see FIGS. 1-3, with a housing 49, in which first and second pistons 50, 51 are coaxially moveable for control of the valve functions. In an upper, first cylinder chamber 52, the first piston 50 is moveable by control pressure supplied via the first control input 36 downwards in the direction of the second piston 51. Here, the first piston 50 has an extension 53 which is directed downwards and has a reduced diameter so that a second cylinder chamber 54 is formed around the extension 53 and thereunder. The second control input 38 leads into second cylinder chamber 54 between the first and second pistons 50, 51. As a result of the extension 53, the first and second pistons 50, 51 always have a minimum distance to one another so that the second control input 38 cannot be closed by the first and second pistons 50, 51.

In certain embodiments, the second piston 51 has a stepped configuration, with a broad head 55 with a seal 56 and a narrower extension 57 with a seal 58. The broad head 55 bears at its edge against a compression spring 59 which pushes the second piston 51 in the direction of the first piston 50.

The narrower extension 57 of the second piston 51 is hollow and provided towards the bottom with an opening 60 as well as close to broad head 55 and to the side with an opening 61. Both openings 60, 61 are sealed off from one another or separated from one another on the outside by a seal 58. In the region of opening 61, an annular space 61a is formed around extension 57, which annular space 61a also has, in addition to opening 61, the third connection 41 as an opening and is otherwise sealed off by seals 56, 58.

The housing 49 has in its lower region a wider, lowermost, annular cylinder chamber 62 and above it a slightly narrower, annular cylinder chamber 63. The second connection 40 is simultaneously an opening of the annular cylinder chamber 63 and the first connection 39 is an opening of the lowermost annular cylinder chamber 62.

An internally circumferential edge 64, against which an auxiliary piston 65 retained in the lowermost annular cylinder chamber 62 pushes upwards via a compression spring 66, is formed at a transition between the two annular cylinder chambers 62, 63. The compression spring 66 is formed to be relatively weak and only brings about the auxiliary piston 65, and in so far as further forces do not act, bears again circumferential edge 64 and there shuts off lowermost annular cylinder chamber 62. The auxiliary piston 65 is typically open at both axial ends and is guided on the inside on a seal 67.

The first piston 50 has, on the outside, a circumferential seal 68. Extension 57 of the second piston 51 is guided in the annular cylinder chamber 63 with the seal 58.

The indications of direction "upwards" and "downwards" relate to the orientation of valve unit 48 in the figures. In practice, valve unit 48 can assume a different position such that the indications of direction have to be amended. Valve unit 48 is embodied here as a 3/2-way valve, with an upper shifting position in FIGS. 2, 5, 6 and a lower shifting position in FIGS. 1, 3, 4, 7.

As a result of the construction of valve unit 48, the functions of the valve arrangement 37 visible in FIG. 4 are combined in a housing (in housing 49). The functions of the valve arrangement 37 are explained below on the basis of FIGS. 4-7:

In the travel position according to FIG. 4, the pneumatic braking system is ready. This means that spring accumulator brake cylinders 44, 45 are aerated by reservoir pressure from the reservoir 24. To this end, the first connection 39 is connected to the second connection 40 via the valve arrangement 37. The valve arrangement 37 is located in an actively shifted, second shifting position. This second shifting position is triggered by the reservoir pressure bearing on the second control input 38 of at least 2.5 bar on reservoir pressure line 22. To this end, the reservoir pressure is conducted from the reservoir pressure line 22 through the parking release valve 23 and through line 42a up to the second control input 38. The reservoir pressure present there acts upon the second piston 51 such that the valve unit 48 assumes the travel position according to FIG. 1. In this case, no pressure bears against the first control input 36, there is no action on the first piston 50 and the first piston 50 is located in its upper position. Since, furthermore, no control pressure from the control pressure line 20 is present, the brake cylinders 30, 31, 32 are also not aerated.

Figure 5:
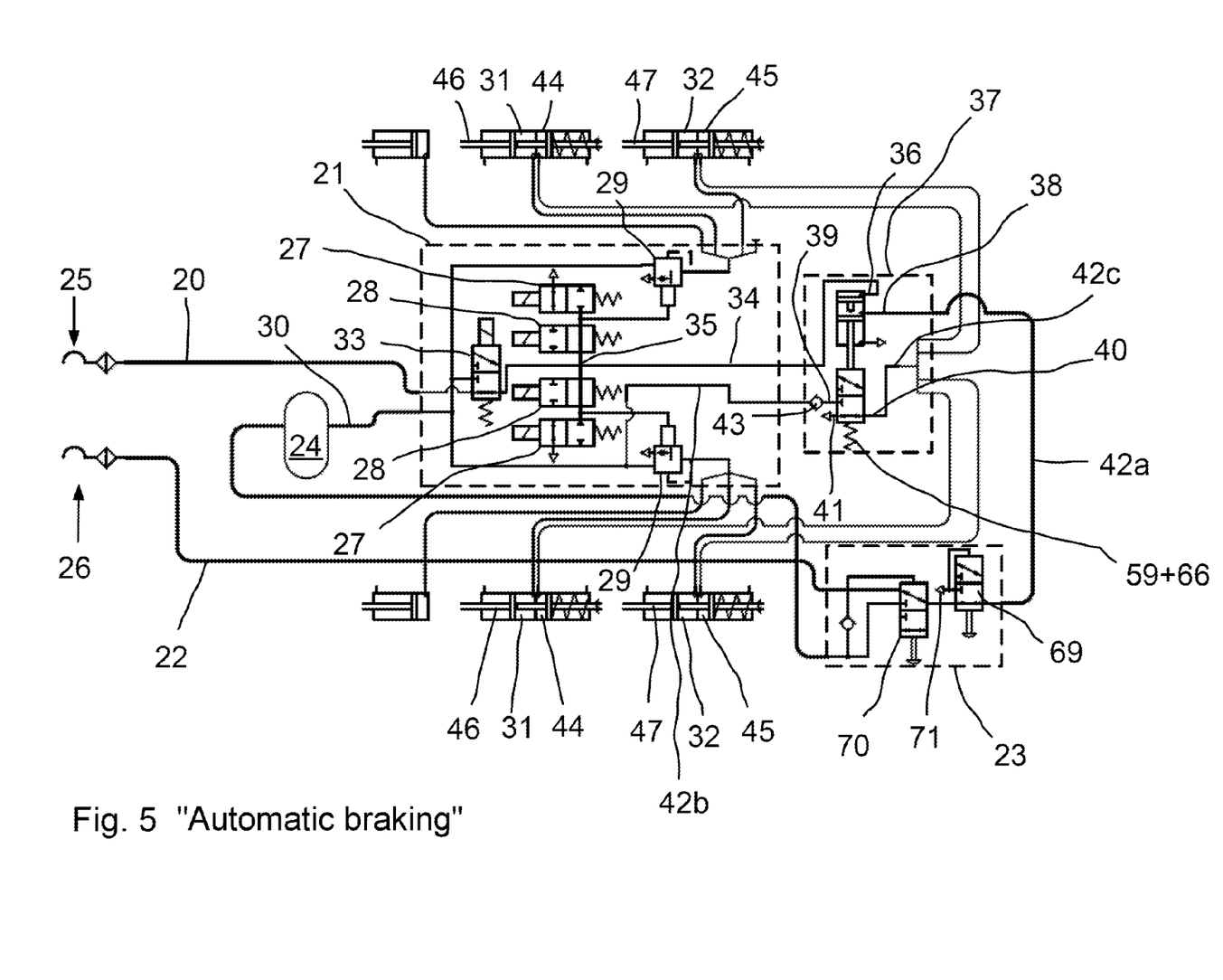
FIG. 5 shows the pneumatic braking system with the double-piston valve in the position for automatic braking.

FIG. 5 shows the components of the pneumatic braking system after automatic braking of the trailer vehicle as a result of loss of the reservoir pressure in reservoir pressure line 22, for example, as a result of the severing of red coupling head 26. The second control input 38 is then also depressurized, just like the first control input 36 without actuation of the service brakes. Both cylinder chambers 52, 54 are correspondingly vented and the first and second pistons 50, 51 are moved upwards by the pressure of spring 59, see also FIG. 2. In contrast to FIG. 4, in FIG. 5, the valve arrangement 37 is located in its upper shifting position. The first connection 39 is shut off. The second connection 40 is connected to the third connection 41 for venting of the spring accumulator brake cylinders 44, 45. The spring accumulator brake cylinders 44, 45 are vented and the trailer vehicle is braked. The service brakes are inactive.

Figure 6:
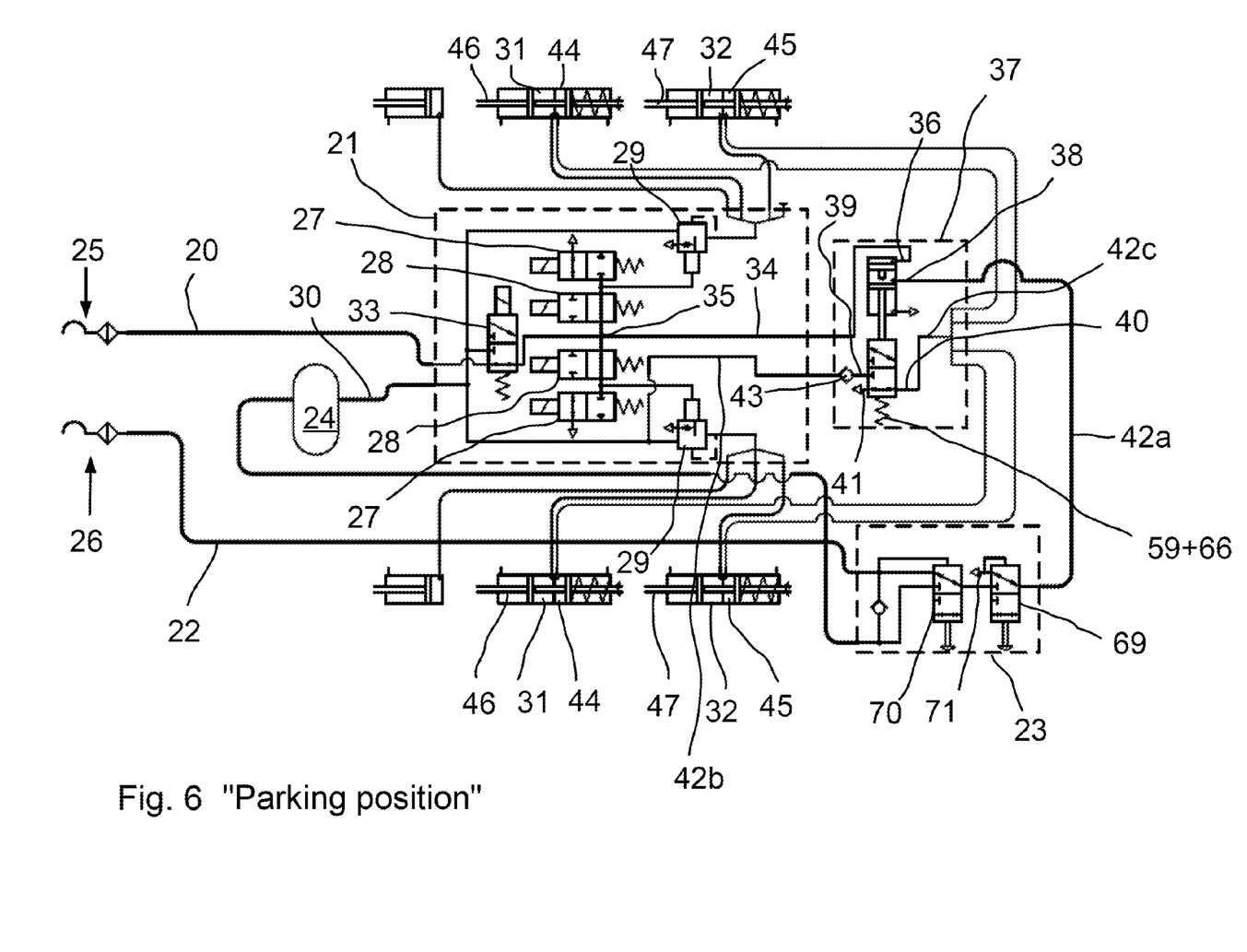
FIG. 6 shows the pneumatic braking system with the double-piston valve in a parking position.

A parking position of the pneumatic braking system is shown in FIG. 6. The valve arrangement 37 assumes the same shifting position as in FIG. 5 during automatic braking after loss of reservoir pressure in the reservoir pressure line 22. In FIG. 6, however, the reservoir pressure can still be present in the reservoir pressure line 22. The pressure loss at the second control input 38 is instead achieved by switching the parking release valve 23. The latter contains at least two valves, namely a parking valve 69 and a release valve 70. In all of the states represented here, release valve 70 is located in the same shifting position. In contrast, in FIGS. 4 and 5, the parking valve 69 is located in a travel position and is only in a parking position in FIG. 6. As a result, the second control input 38 is connected to a vent 71 on the parking valve 69 and is thus depressurized. The service brake is inactive. The first control input 36 is also depressurized. The cylinder chambers 52, 54 are vented. The valve arrangement assumes the same position as in the case of automatic braking in FIG. 5. As a result, the second connection 40 is connected to the third connection 41 for venting of the spring accumulator brake cylinders. The vehicle is braked.

Figure 7:
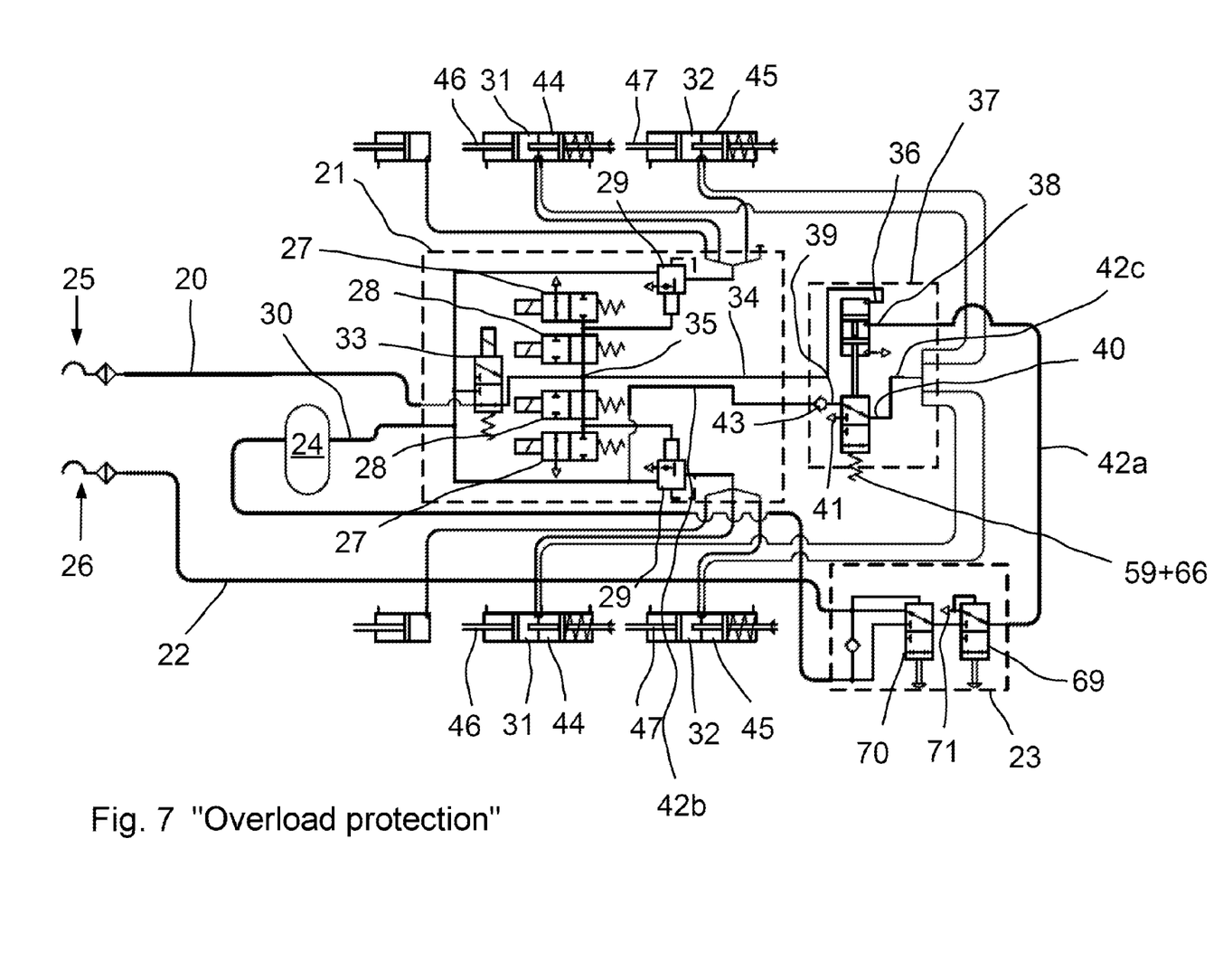
FIG. 7 shows the pneumatic braking system with the double-piston valve in the position for overload protection.

The function of the valve arrangement 37 as overload protection is apparent in FIG. 7. A double loading within service brake cylinders 30, 31 and 32 by actuation of the service brake on one hand and by the force of the vented spring accumulator brake cylinders 44, 45 on the other hand should be avoided. This proceeds from the parking position according to FIG. 6 with the shifted parking valve 69. According to FIG. 7, control pressure is additionally present in the control pressure line 20. This controls the supply of the reservoir pressure from the reservoir 24 to the service brake cylinders 31, 32 via the solenoid valves 27, 28 and the relay valves 29. The more control pressure is fed in, the higher the additional mechanical forces within the service brake cylinders 31, 32. Since spring accumulator brake cylinders 44, 45 are already vented, the total forces can become excessive. The control pressure is furthermore conducted via the first control input 36 into the cylinder chamber 52, see FIG. 3. Depending on the hardness and characteristic of the compression spring 59 (and the compression spring 66), the valve arrangement 37 shifts from the parking position according to FIG. 5 into the position according to FIG. 7. As a result, the first connection 39 is connected to the second connection 40 and the spring accumulator brake cylinders 44, 45 are aerated with pressure from the reservoir 24. As a result, only the service brakes are still active. As soon as the control pressure abates again, the valve arrangement 37 shifts back into the position according to FIG. 6 and the spring accumulator brake cylinders 44,45 are vented again.

In the case of the overload protection represented on the basis of FIG. 7, aeration and venting of the spring accumulator brake cylinders 44, 45 are not carried out proportionally to the change in control pressure. On the contrary, the spring accumulator brake cylinders 44, 45 are vented or aerated as a function of the exceeding or undershooting of a control pressure threshold value. The threshold value here is 2.5 bar or more. The overload protection is also active proceeding from the state shown in FIG. 5 (automatic braking).

Figure 9:
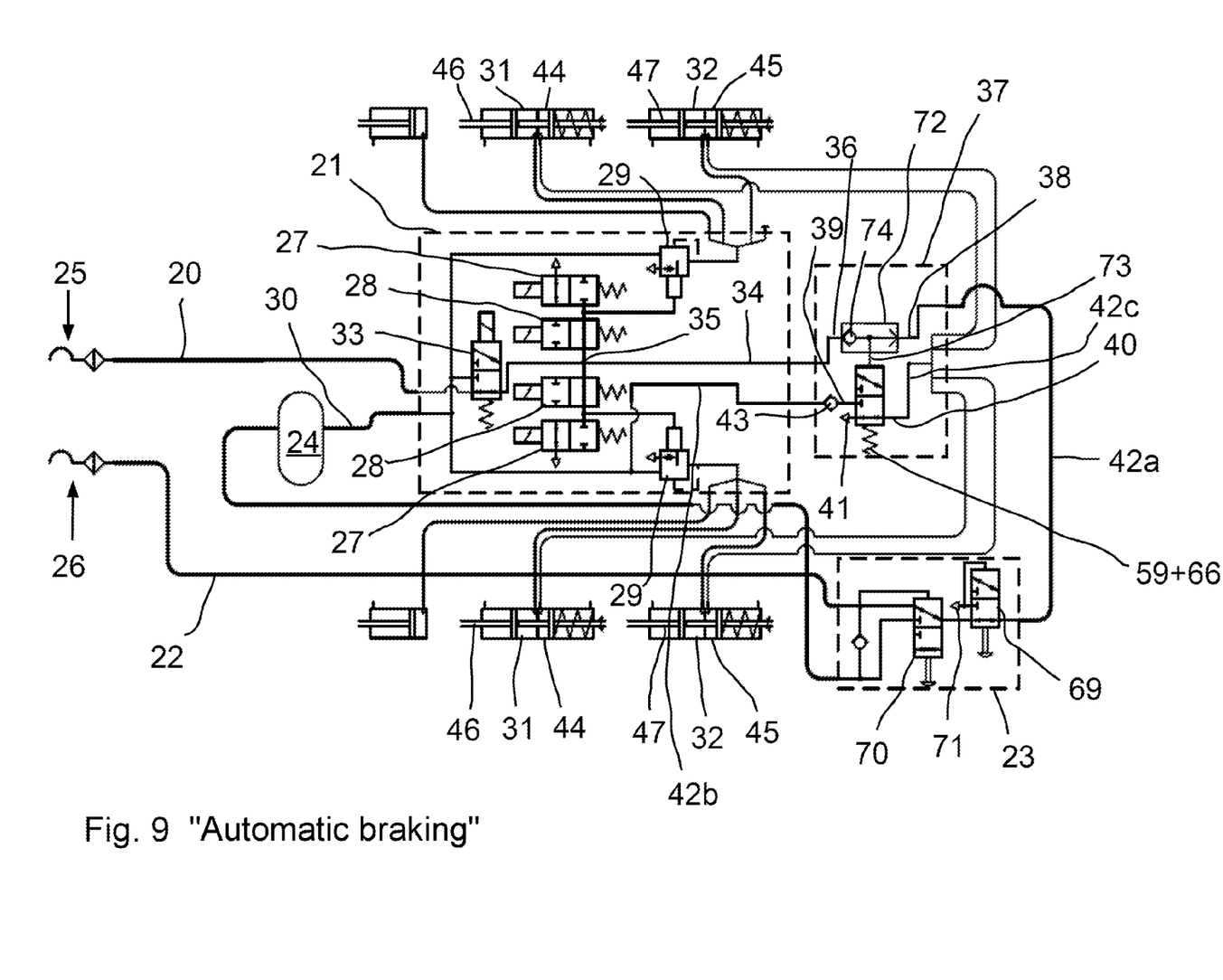
FIG. 9 shows the pneumatic braking system with the Select-High valve in a position for automatic braking.
Figure 10:
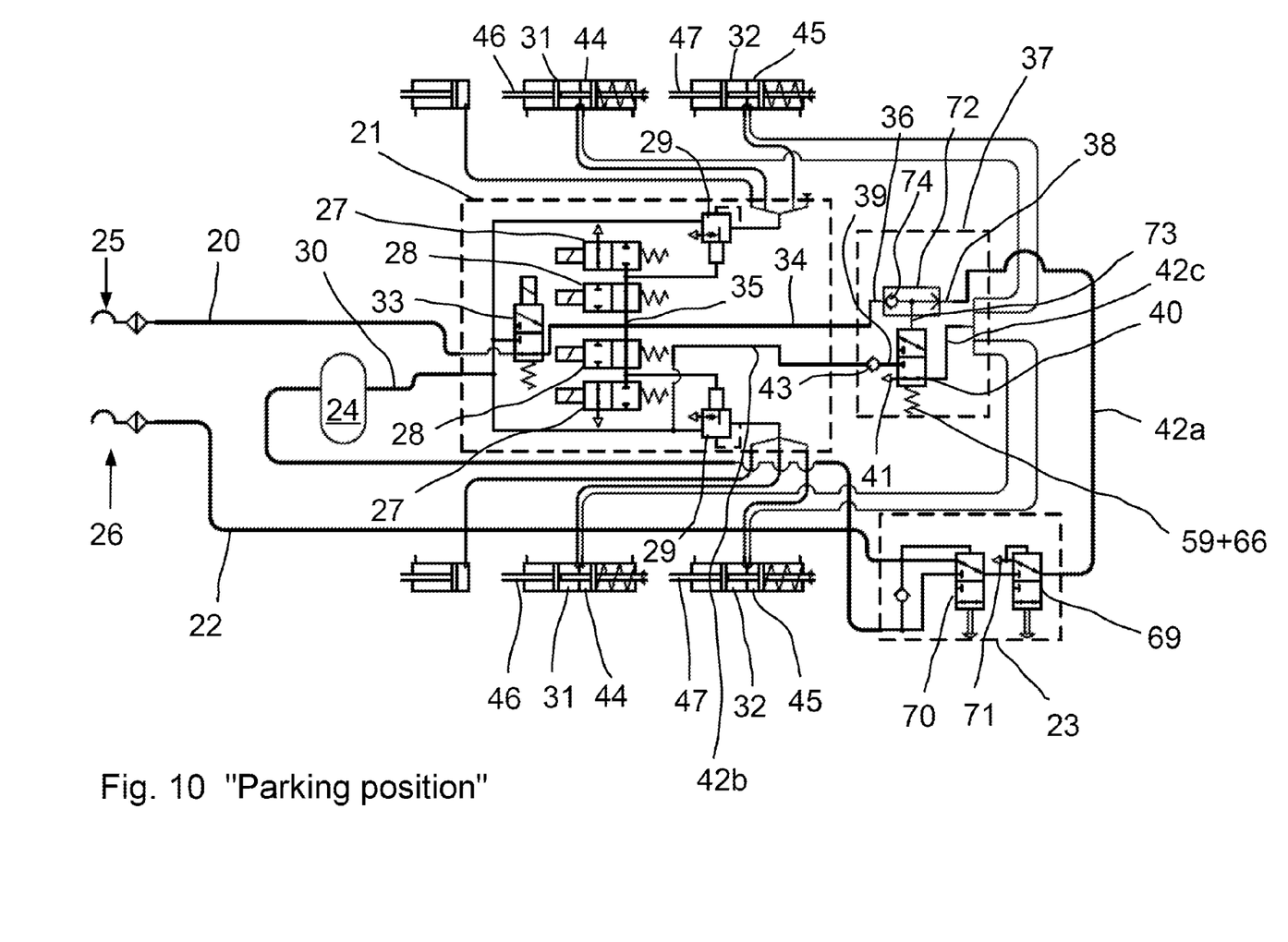
FIG. 10 shows the pneumatic braking system with the Select-High valve in a parking position.
Figure 11:
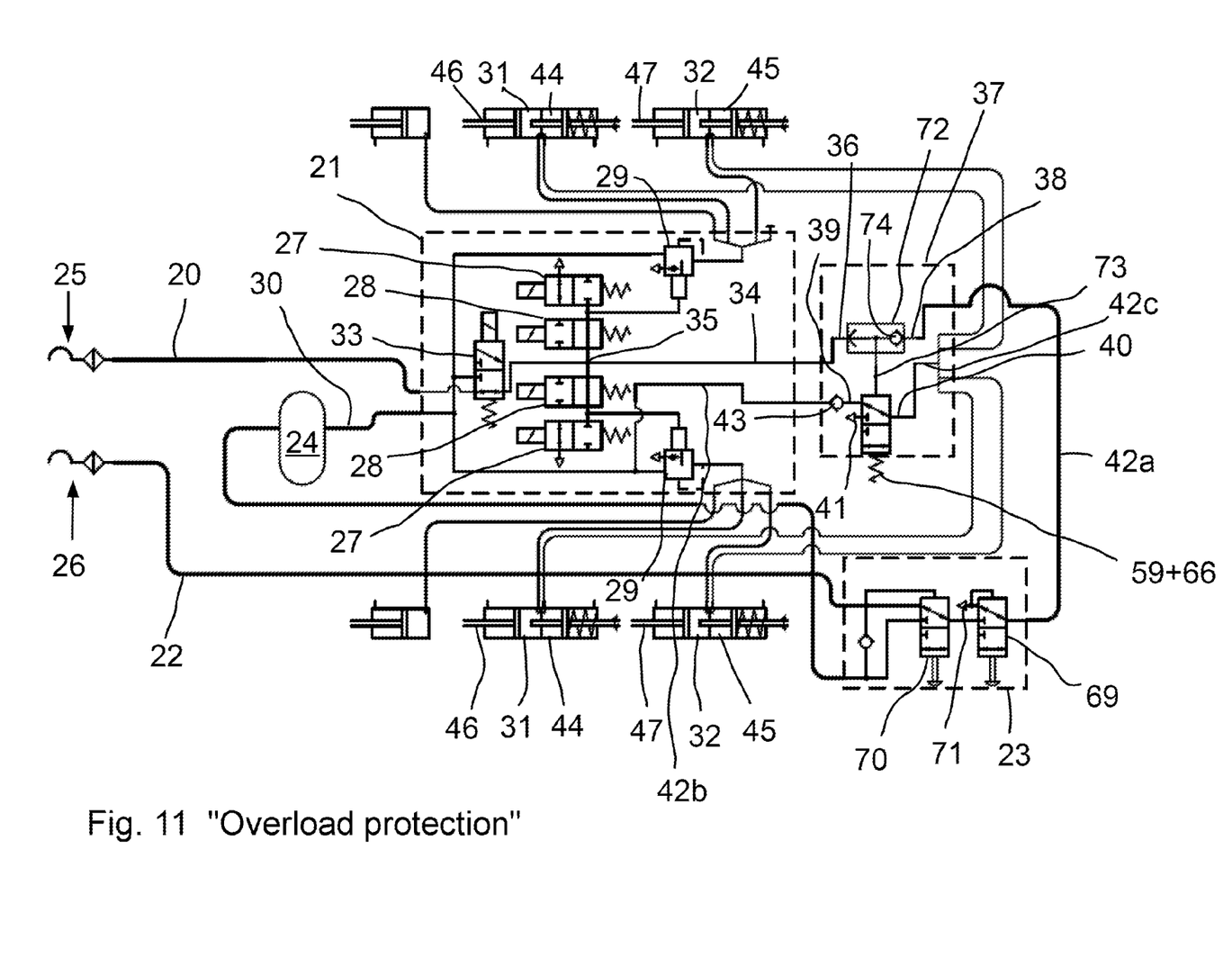
FIG. 11 shows the pneumatic braking system with the Select-High valve in a position for overload protection.

FIGS. 8-11, like FIGS. 4-7, relate to the various states, travel position (FIG. 8), automatic braking (FIG. 9), parking position (FIG. 10) and overload protection (FIG. 11). In contrast to FIGS. 4-7, the valve arrangement 37 of FIGS. 8-11 is formed in a different manner, namely not with a double-piston valve, but rather with aSelect-High valve 72 for control of the two states of the valve arrangement 37 and the connection of connections 39, 40, 41. The Select-High valve 72 allows the higher pressure present at the first and second control inputs 36, 38 to pass through to a third control input 73. The valve arrangement 37 assumes the associated shifting position depending on the pressure present here. Implementation in practice is possible as a 3/2-way valve and by modifying the valve unit 48 in FIGS. 1-3. The first piston 50 is omitted, the second control input 38 remains closed and the first control input 36 is replaced by a third control input 73. This is fed from the Select-High valve 72.

Figure 8:
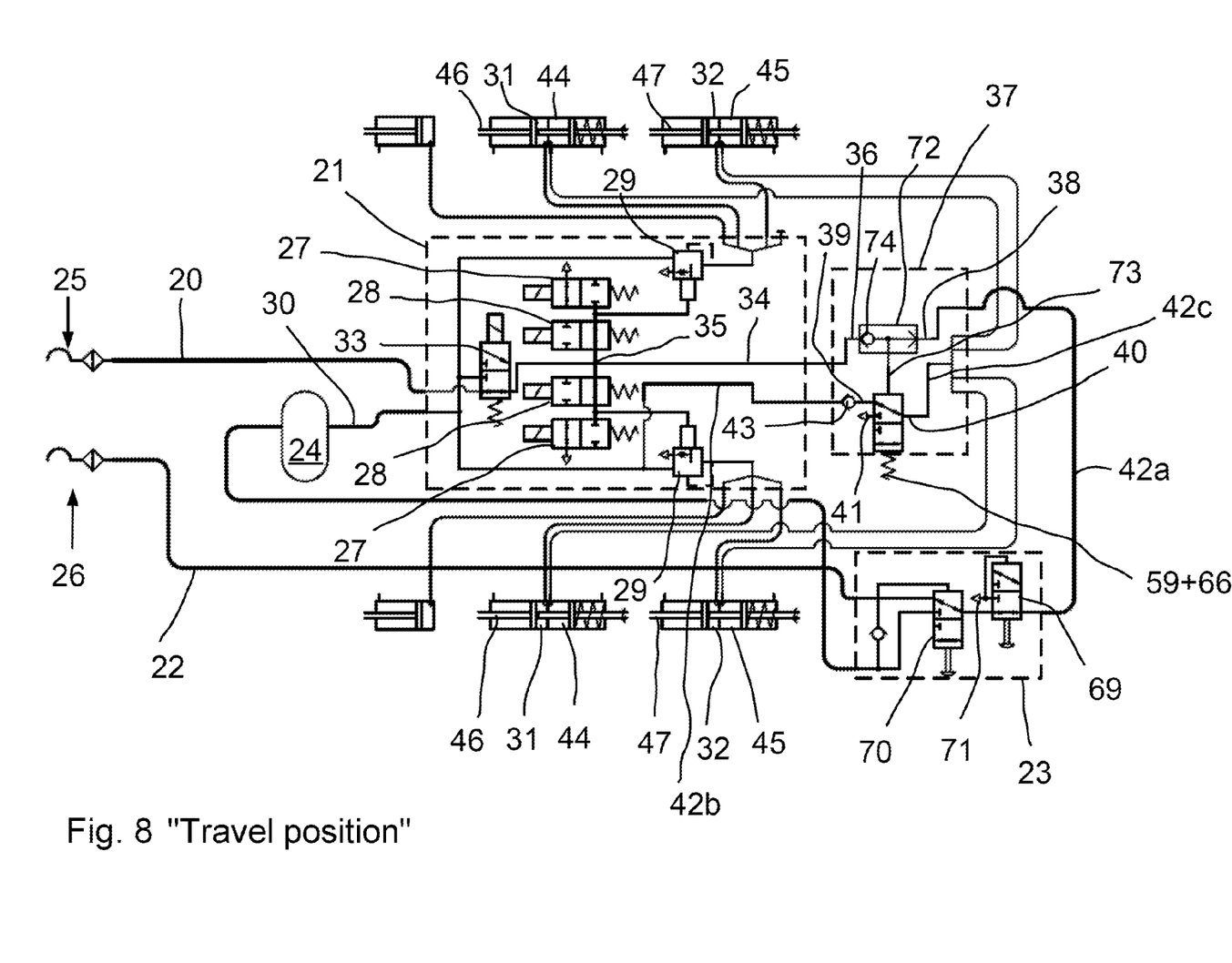
FIG. 8 shows the pneumatic braking system with a Select-High valve in a travel position.

The Select-High valve 72 contains, between the first and second control inputs 36, 38, a check function so that the respectively present higher pressure can only reach the third control input 73 and cannot escape via the control input with the lower pressure. The sign of the pressure difference at the first and second control inputs 36, 38 is apparent in FIGS. 8-11 on the basis of the position of a ball 74. In FIG. 8 (travel position), reservoir pressure is present at the second control input 38, while a lower or no control pressure is present at the first control input 36. In FIG. 9 (automatic braking), the second control input 38 becomes depressurized from the travel position by severing the reservoir pressure line 22, while the first control input 36 is in any case depressurized. The ball 74 remains in front of the first control input 36 until no pressure is present any more at the second control input 38.

In FIG. 10 (parking position), the travel position according to FIG. 8 is also the starting point for consideration. In the travel position, the full reservoir pressure is present at the second control input 38 (as in FIG. 8). The vehicle is braked by means of the service brakes by regulation of the control pressure. In the parking position, the service brakes are fundamentally not actuated, i.e. no pressure is present any more at the first control input 36 and the second control input 38 is simultaneously vented via the parking valve 69. Up until final venting of the second control input 38, the ball 74 remains in the position according to FIG. 10, i.e. on the left. The spring accumulator brake cylinders 44,45 are vented, the spring accumulator brakes retain the trailer vehicle.

Proceeding from the parking position according to FIG. 10, the position according to FIG. 11 (overload protection) is produced upon actuation of the service brake during the parking position. Control pressure is then active at the first control input 36. The ball 74 migrates into the right position according to FIG. 11 and the control pressure reaches the third control input 73 for switching of the valve arrangement 37. The overload protection was previously only explained proceeding from the parking position according to FIGS. 6 and 10. There is also overload protection proceeding from automatic braking (FIGS. 5 and 9). If the service brake is namely actuated after automatic braking, control pressure reaches the first control input 36. the second control input 38 can remain depressurized. The valve arrangement 37 switches into the position shown in FIGS. 7 and 11 with aeration of spring accumulator brake cylinders 44, 45.

Figure 12:
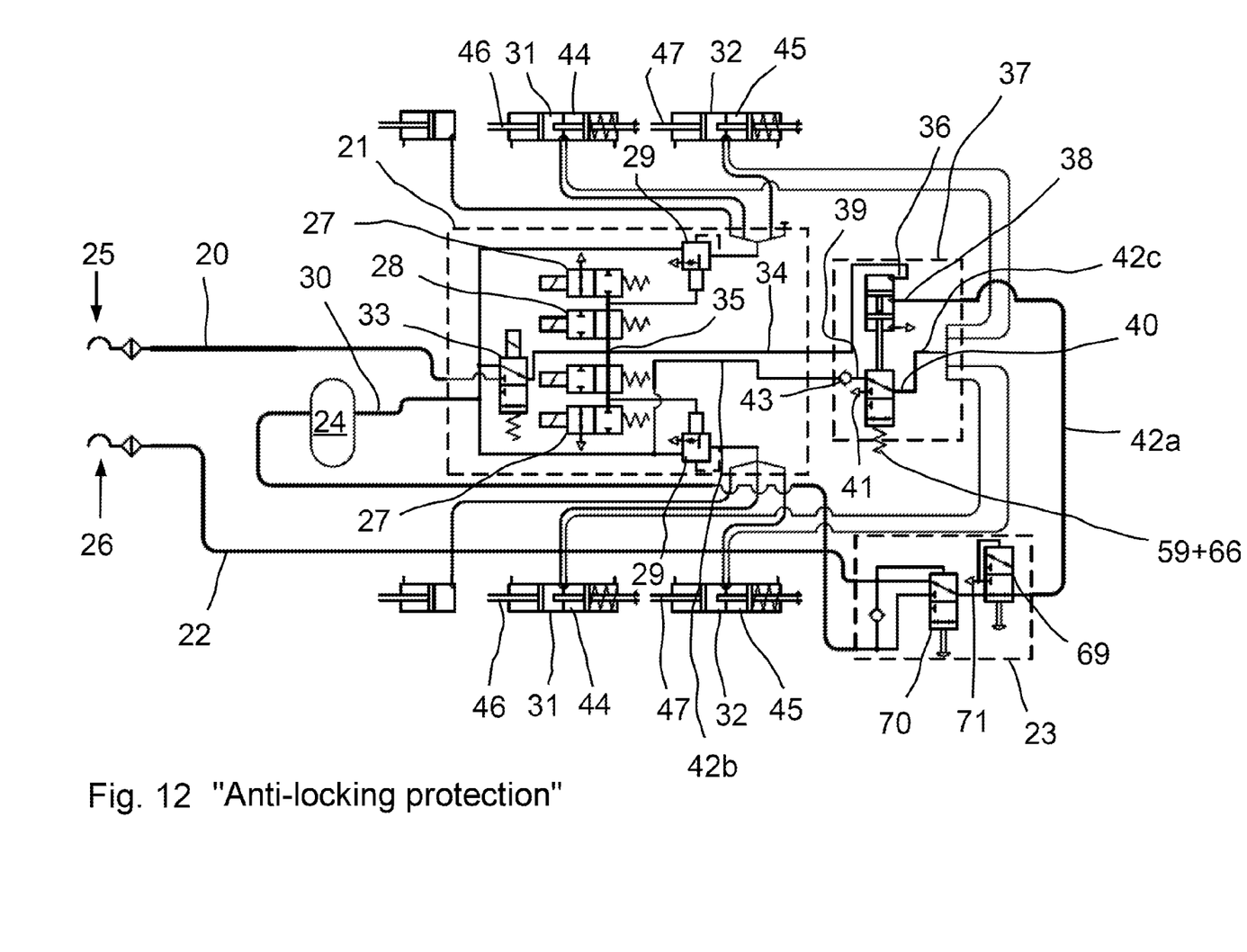
FIG. 12 shows the pneumatic braking system with the double-piston valve and an activated anti-locking protection.

FIG. 12 shows a further particularity of certain embodiments. Automatic braking is assumed (FIGS. 5 and 9). The second control input 38 is depressurized by severing the reservoir pressure line 22. The trailer vehicle is severely braked by the spring accumulator brake cylinders 44, 45. The wheels can lock. The normally present antilocking control system is not active for the service brake. In order to thus enable an anti-locking control system via the trailer brake module 21, the redundancy valve 33 shifts from the position of FIGS. 4-11 into the position according to FIG. 12. As a result, the control pressure no longer arrives at the first control input 36 via the redundancy valve 33, but rather the reservoir pressure arrives from the reservoir 24 via the line 30. The valve arrangement 37 correspondingly shifts into the position according to FIG. 12 so that the reservoir pressure also arrives at the second connection 40 and can aerate the spring accumulator brake cylinders 44, 45. The trailer vehicle can thus be braked via its own service brakes (service brake cylinders 31, 32) with reservoir pressure from the reservoir 24. The anti-locking control system normally present in trailer brake module 21 is active here.

An electronic braking system is assigned to the pneumatic braking system. One component of the electronic braking system is a brake control device which is not shown here and which is integrated into trailer brake module 21 or can be additionally present. The brake control device obtains status information in a manner known per se via sensors at the pneumatic braking system and controls the trailer brake module 21. For example, control pressure and reservoir pressure are monitored, here typically also the position of the valve arrangement 37. In the event of a sudden loss of pressure in the reservoir pressure line 22 and sufficient pressure in the reservoir 24, the brake control device can switch the redundancy valve 33 into the position according to FIG. 12 and simultaneously bring about emergency braking with anti-locking protection via the trailer brake module 21 with control of solenoid valves 27, 28. It is only if the reservoir 24 no longer has sufficient pressure that the redundancy valve 33 is not actuated into switching so that automatic braking is carried out by the spring accumulator brake cylinders 44, 45.

What is claimed is:

1. A valve arrangement for aerating spring accumulator brake cylinders in a trailer vehicle with a pneumatic braking system, said valve arrangement comprising:
    a first connection for a line connected to a reservoir of the trailer vehicle,
    a second connection for a line leading to spring accumulator brake cylinders, and
    a first pneumatic control input,
    wherein the first connection is connectable to the second connection depending on a pressure on the first pneumatic control input, and
    wherein the first pneumatic control input is alternatively connected to a line connected to a control connection of the trailer vehicle or to a line connected to the reservoir by operation of a redundancy valve.

2. The valve arrangement as claimed in claim 1, wherein the first connection is connected to the second connection if a pressure above a threshold value is present in the line connected to the first pneumatic control input.

3. The valve arrangement as claimed in claim 1 further comprising a third connection as a vent, wherein the second connection is connectable to the third connection or to the first connection.

4. The valve arrangement as claimed in claim 1, further comprising a second pneumatic control input, the second pneumatic control input being connected to a line connected to a supply connection, wherein the first connection is connectable to the second connection depending on a pressure on the second pneumatic control input.

5. The valve arrangement as claimed in claim 4, wherein the first connection is connected to the second connection if a pressure above a threshold value acts on at least one of the first and second pneumatic control inputs.

6. The valve arrangement as claimed in claim 1, further comprising a multi-way valve with at least two shifting positions, wherein the first pneumatic control input, the first connection and the second connection are assigned to the multi-way valve.

7. The valve arrangement as claimed in claim 6, further comprising a third connection assigned as a venting connection to the multi-way valve.

8. The valve arrangement as claimed in claim 6, further comprising a second pneumatic control input assigned to the multi-way valve, wherein the second pneumatic control input is connected to a line connected to a supply connection.

9. The valve arrangement as claimed in claim 1, wherein:
a pressure from the line coming from the control connection of the trailer vehicle or a pressure from the line coming from the reservoir is present at the first pneumatic control input,
a reservoir pressure from a reservoir pressure line is present at a second pneumatic control input,
the pressure from the line coming from the reservoir is present at the first connection,
a pressure from a line leading to the spring accumulator brake cylinders is present at the second connection,
a third connection is provided for venting, and
the valve arrangement is configured such that:
upon exceeding of a threshold value of the pressure at the second pneumatic control input and undershooting of a threshold value of the pressure at the first pneumatic control input, the first connection is connected to the second connection (travel position),
upon undershooting of a defined threshold value of the pressure at the first pneumatic control input and undershooting of a defined threshold value of the pressure at the second pneumatic control input, the second connection is connected to the third connection and the first connection is shut off (automatic braking and parking position), and
upon exceeding of a defined threshold value of the pressure at the first pneumatic control input and undershooting of a defined threshold value of the pressure at the second pneumatic control input, the first connection is connected to the second connection (overload protection).

10. The valve arrangement as claimed in claim 1 further comprising:
a parking/release valve, and
a multi-way valve with at least two shifting positions, wherein the valve arrangement vents the spring accumulator brake cylinders in a first shifting position and in a second shifting position connects the line to the reservoir to the spring accumulator brake cylinders via a check valve,
wherein the first pneumatic control input is connectable via a further shift element to the line to the control connection of the trailer vehicle or to the line to the reservoir,
wherein a second pneumatic control input is connectable via the parking/release valve to a reservoir pressure line to a supply connection or to the line to the reservoir or to a vent,
wherein the multi-way valve shifts into the second shifting position if at least one of the first and second pneumatic control inputs conducts a pressure which exceeds a threshold value, and
wherein the multi-way valve shifts into the first shifting position if both the first and second pneumatic control inputs conduct pressures which undershoot threshold values.

11. The valve arrangement as claimed in claim 10, wherein the further shift element is part of a trailer brake module.

12. The valve arrangement as claimed in claim 1 wherein the first pneumatic control input is part of a Select-High valve with two or more pneumatic control inputs.

13. The valve arrangement as claimed in claim 1 further comprising a valve unit for venting the spring accumulator brake cylinders said valve unit comprising a first piston, a first cylinder chamber, a second piston and a second cylinder chamber,
wherein the first cylinder chamber has the first pneumatic control input,
wherein the first and the second pistons are held coaxially to one another and are moveable,
wherein the second cylinder chamber is provided between the first and the second pistons and has a second pneumatic control input for a pressure from a line connected to a supply connection, and
wherein the first piston or the second piston has an extension which protrudes into the second cylinder chamber.

14. A pneumatic braking system for a trailer vehicle, said pneumatic braking system comprising a valve arrangement as claimed in claim 1.

15. A trailer vehicle with a pneumatic braking system as claimed in claim 14.

16. A valve unit for aerating spring accumulator brake cylinders of a pneumatic braking system, said valve unit comprising:
a first connection, a second connection and a third connection on a housing, wherein a connection from the first connection to the second connection can be switched to a connection from the first connection to the third connection,
a first piston between a first cylinder chamber and a second cylinder chamber in the housing,
wherein the first cylinder chamber has a first pneumatic control input and the second cylinder chamber has a second pneumatic control input,
a second piston between the second cylinder chamber and a third cylinder chamber,
wherein the first piston or the second piston has an extension which protrudes into the second cylinder chamber.

17. A pneumatic braking system for a trailer vehicle, said pneumatic braking system comprising a valve unit as claimed in claim 16.

18. A trailer vehicle with a pneumatic braking system as claimed in claim 17.

19. A method for operating a pneumatic braking system for a trailer vehicle, the pneumatic braking system comprising a control connection, supply connection, service brakes, spring accumulator brakes, a reservoir and a valve arrangement with a pneumatic control input, said method comprising:

aerating spring accumulator brake cylinders from the reservoir depending on a pressure on the pneumatic control input, wherein the pressure on the pneumatic control input is alternatively derived from a pressure on the control connection of the trailer vehicle or from a pressure in the reservoir by operation of a redundancy valve.

* * * * *